Feb. 20, 1934.     B. G. DWYRE     1,947,699
SLIDE RULE
Filed April 20, 1933
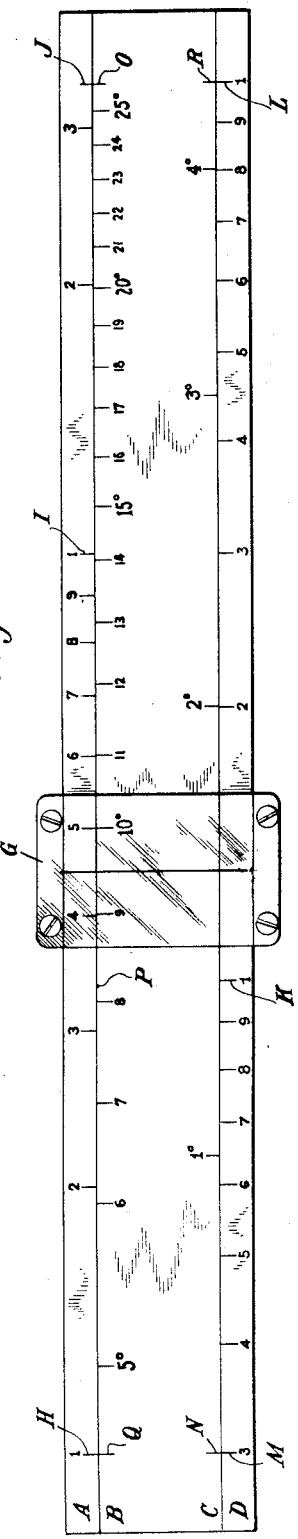
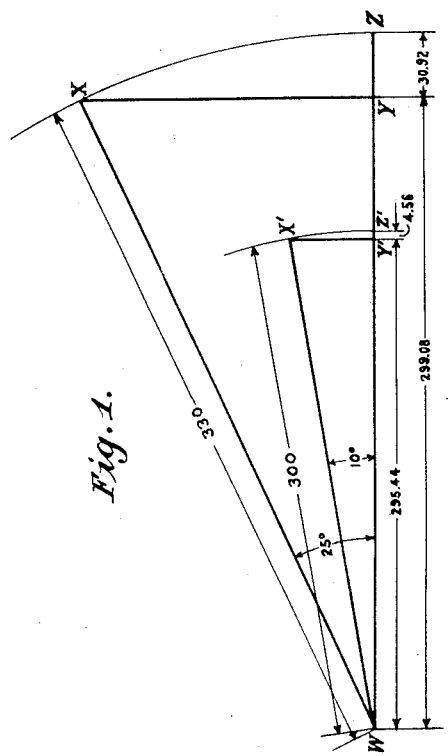
Inventor
Burton G. Dwyre
By Cushman, Darby & Cushman
Attorneys Patented Feb. 20, 1934

1,947,699

UNITED STATES PATENT OFFICE 1,947,699

SLIDE RULE

Burton G. Dwyre, Silver City, N. Mex.

Application April 20, 1933. Serial No. 667,078

12 Claims. (Cl. 235—70)

The present invention relates to slide rules of the type in which multiplication is performed by the addition of logarithms.

The principal object of the invention is to provide a slide rule for determining the difference between the slope distance between two points along a grade and the horizontal distance between the two points, which may be read with sufficient accuracy of result to be useful to surveyors in the field.

Another object of the invention is to provide a slide rule of this character so calibrated that it may be made small enough to be conveniently carried in the field.

In surveying or like operations in the field, it is frequently desirable to compute the horizontal distance between two points on a grade. In computing this distance, the known arguments are the slope distance along the grade and the slope angle. Knowing these arguments, it is possible to compute the horizontal distance by the use of trigonometric formulæ. Such is at present the universal practice. To make in the field the calculations required involves enormous labor, the consumption of a great deal of time and the constant and multiplied possibility of error. The tables which may be used to diminish the amount of labor and time consumed are very inconvenient for use in the field, particularly in case of bad weather which is frequently encountered. Even with the use of these tables the possibilities of error are by no means eliminated.

In order to eliminate the probability of error, diminish the time consumed and overcome the necessary inconvenience of the present practice, I have devised a slide rule which is small enough to be convenient for use, and which in addition, is so graduated that it can be used for determining the horizontal distance of grades having a slope up to 25° and which will obtain results sufficiently accurate for practical use.

In the drawing, which is illustrative, and only approximately graduated to proper logarithmic lengths:—

Figure 1 is a diagram illustrating the problem to be solved,

Figure 2 is a plan view of the face of the slide rule, and

Figure 3 is an end view of the slide rule shown in Figure 2, looking from right to left.

In Figure 1, a right triangle is shown in full lines, representing an extreme problem which might have to be solved by a surveyor, in which the slope distance is WX, and the horizontal distance to be solved for is WY. The slope angle is shown as 25°. In solving this triangle, the most common method would be the cosine method, and in this method the horizontal distance WY would equal the measured slope distance WX times the cosine of the slope angle 25°. I have ascertained that although a slide rule could be constructed to solve the triangle by means of the cosine method, a more accurate result may be obtained by using the versed sine of the angle rather than the cosine, and I have devised a slide rule which solves for the horizontal distance WY by the versed sine of the slope angle, by obtaining the distance YZ, which is the difference between the slope distance and the horizontal distance. This difference having been quickly obtained by the slide rule, it may easily be subtracted from the slope distance WX to obtain the horizontal distance WY.

In Figures 2 and 3, the slide rule which I have devised for determining this difference is illustrated. The rule is of the well known structure made of two parts, a main part carrying the scales A and D, and a double edged slider carrying the scales B and C. To facilitate reading, a cursor G of the conventional type may be used.

Scale A is graduated in accordance with the logarithms of natural numbers, said graduations being marked or numbered in accordance with the respective anti-logarithms. Scale A is partly of the conventional type, and in Figure 2, distances marked along scale A from point H to point I represent the value of the logarithms of the respective numbers from 1 to 10. From point I to point J, this marking is repeated in part, up to point J representing the logarithm of 33. Scale D is graduated similarly to scale A, in that the portion of scale A between points H and I is repeated on scale D between points K and L, point L being directly below point J. The portion of scale D between points K and M is a partial repetition of that between points K and L. This arrangement of scales A and D provides cooperation with the scales on the slider in a manner hereinafter described.

It is obvious that the rule may be made of various sizes by making A and D to any desired scale. Furthermore, the main units on scales A and D may be subdivided into as many graduations as is desirable. For instance, I contemplate graduating scale A into 100 subgraduations between units 1 and 2, each subgraduation being placed in accordance with the logarithm of the number.

Scales B and C are graduated in accordance with the logarithms of the versed sine of angles of elevation, from 1' at point N to 25°, 50' and 32" at point O, said graduations being marked or numbered with the angular value corresponding respectively with the logarithmic graduation. The designations increase from left to right on scale C, and continue to increase from left to right on scale B. The main units on scales B and C may likewise be subdivided into as many sub-graduations as desirable; for instance, I contemplate graduating scale C between 1° and 2° into sixty parts designating minutes.

Scales B and C are graduated to coordinate with scales A and D in the following manner. An index point is first established at O near the right end of scale B, point O being opposite point J on scale A when the rule is in the position of Figure 2. It being desirable to have a range of angles from 0 to 25°, point O is to represent an angular value of 25°, 50' and 32", this angle having a natural versed sine of .1.

Other angles useful in making the calibration between 0° and 25° are as follows:

Natural versed sine 8°, 6', 30"=0.01.
Natural versed sine 2°, 34'=0.001.
Natural versed sine 0°, 48'=0.0001.
Natural versed sine 0°, 15'=0.00001.

These angles having natural versed sines of 1, the logarithmic value of their versed sines would be 0, consequently they may be used as index points in calibrating the scales.

For convenience, the slide may be then moved to the left to a position where point O is in line with point I. Desired angles between 8°, 6' and 30" and 25°, 50' and 32" may then be marked on scale B beneath the proper point on scale A conforming to the value of their natural versed sines. For example, to place 15° on scale B, the natural versed sine of 15° being 0.03407, locate 3407 by the numbers on scale A, and then drop down from this point on to scale B and label it 15°. In this position of the slider, a point on scale B equal to 8°, 6' and 30" will be lined up with point H on scale A, that angle having a natural versed sine of .01. After the desired angles have been marked on this part of scale B, it may be moved so that point P (which is equal to 8°, 6' and 30") conforms to point I on scale A, after which the balance of the angles may be marked on scale B in the same manner. It will be found that the left end, that is point Q, of scale B will designate an angle of 4°, 27' and 40". Scale B being a continuation of scale C, the right hand end of scale C, that is the point R, will also designate an angle of 4°, 27' and 40". If point R is moved into position with the point on scale D marked in accordance with the value of the versed sine of 4°, 27' and 40", the balance of the rule may be graduated in the same manner as above. It will thus be seen that by disposing the angles on both edges of the slider in such manner as to cooperate with the fixed scales, a very compact rule capable of accurate reading results.

In using this rule, having measured the slope distance, the index mark on scale B is moved to the measured slope distance on scale A, and the difference between the slope distance and the horizontal distance may then be read on scale A or D opposite the measured slope angle on scales B or C.

A typical problem encountered in the field will illustrate the fine degree of accuracy obtainable by using this rule. In Figure 1, a problem is shown in full lines, the slope distance WX' being equal to three hundred feet and the slope angle being equal to 10°. By setting the index point of scale B opposite three hundred on scale A, the difference Y'Z' may be read on scale A opposite the 10° mark on scale B, said difference being 4.56 feet. This difference is then subtracted from three hundred feet to obtain the horizontal distance WY' which will be 295.44. Assuming that it is possible to read the rule only to three significant figures, it is apparent that the result obtained is accurate to two decimal places. If the cosine method were used, a horizontal distance WY' would be solved for directly, by multiplying a slope distance by the cosine of the slope angle, and the result would be approximately seventy times the distance being read on my rule. This advantage is further evident, again assuming that it is possible to read the result only to three significant figures, that in reading a rule graduated in accordance with the cosine method, it would only be possible to read accurately to units, in comparison with reading to two decimal places as is possible using the versed sine rule.

A further advantage may be exemplified, considering the same problem as above, and assuming that the user of the rule has made an error of five feet in setting the problem on the scale. Should the rule be set on three hundred and five feet, using the versed sine rule, a correction of 4.63 feet would be read, and upon subtracting this difference from three hundred a horizontal distance of 295.37 would result. Thus an error of five feet in the slide rule setting would only cause an error in the horizontal distance of seven one hundredths (.07). If a rule graduated for the cosine method had been used, and a like error of five feet had been made, the horizontal distance read directly on the rule would be 300.37, thus giving an error of 4.93 feet, as compared to the error of seven one hundredths using the versed sine rule.

It is apparent that slide rules of this type may be made of any convenient size, but my invention is particularly applicable to rules of relatively short length, in order that they may be conveniently carried and handled during field work. The rule lends itself admirably to the work for which it is to be used, giving maximum accuracy with minimum size. The surveyor is seldom concerned with angles greater than 25°, and by graduating the slider in degrees from 1' to 25°, the low angles on one edge and the higher ones on the other, the entire range of angles may be used on a conveniently small rule.

I claim:—

1. A slide rule for determining the difference between the slope distance and the horizontal distance, comprising a fixed member and a slidable member, one of said members having a scale graduated in accordance with the logarithms of natural numbers, and the other of said members having a scale graduated in accordance with the logarithms of the natural value of the versed sine of angles.

2. A slide rule for determining the difference between the slope distance and the horizontal distance, comprising a fixed member and a slidable member, said fixed member having a scale graduated in accordance with the logarithms of natural numbers, and said slidable member having a scale graduated in accordance with the logarithms of the natural value of the versed sine of angles.

3. A slide rule for determining the difference between the slope distance and the horizontal distance, comprising a channeled member having scales on each edge of said channel, a member slidable within said channel, and a pair of scales on said slidable member graduated in accordnce with the logarithms of the natural value of the versed sine of angles, each of said slidable member scales being adapted to cooperate with one of the scales on the channel member.

4. A slide rule for determining the difference between the slope distance and the horizontal distance, comprising a fixed member and a double edged slidable member, said fixed member being graduated in accordance with the logarithms of natural numbers, and said slidable member having both edges thereof graduated in accordance with the logarithms of the natural value of the versed sine of angles.

5. A slide rule for determining the difference between the slope distance and the horizontal distance, comprising a pair of fixed scales on one member graduated in accordance with the logarithms of natural numbers, and a slidable scale graduated in accordance with logarithms of the natural value of the versed sine of angles to be positioned with respect to one of said fixed scales in order to read the result on the other of said fixed scales.

6. A slide rule for determining the difference between the slope distance and the horizontal distance, comprising a fixed member and a slidable member, one of said members having a scale graduated in accordance with the logarithms of natural numbers corresponding to slope distances, and the other of said members having a scale graduated in accordance with the logarithms of the natural value of the versed sine of angles corresponding to angles of elevation.

7. A slide rule for determining the difference between the hypotenuse and an adjacent side of a triangle, comprising a fixed member and a slidable member, one of said members having a scale graduated in accordance with the logarithms of natural numbers corresponding to hypotenuse lengths, and the other of said members having a scale graduated in accordance with the logarithms of the natural value of the versed sine of angles corresponding to included angles.

8. A slide rule for determining the difference between the slope distance and the horizontal distance, comprising a pair of members longitudinally movable with respect to one another, one of said members having a scale graduated in accordance with the logarithms of natural numbers, and the other of said members having a scale graduated in accordance with the logarithms of the natural value of the versed sine of angles.

9. A slide rule for determining the difference between the slope distance and the horizontal distance, comprising a member graduated in accordance with the logarithms of natural numbers, a double edged member movable with respect to said first named member, and graduations on said double edged member in accordance with the logarithms of the natural value of the versed sine of angles.

10. A slide rule for determining the difference between the slope distance and the horizontal distance, comprising a channeled member having scales on each edge of said channel graduated in accordance with the logarithms of natural numbers, a double edged member slidable within said channel, and a scale graduated in accordance with the logarithms of the natural value of the versed sine of angles on each edge of said double edged member, one of said versed sine scales being a continuation of the other.

11. A slide rule for determining the difference between the slope distance and the horizontal distance, comprising a member provided with a pair of scales graduated in accordance with the logarithms of natural numbers, and a second member provided with a scale graduated in accordance with the logarithms of the natural value of the versed sine of angles movable between the scales of said first named member.

12. A slide rule for determining the difference between the slope distance and the horizontal distance, comprising a member provided with a pair of scales graduated in accordance with the logarithms of natural numbers, and a second member provided with a pair of scales graduated in accordance with the logarithms of the natural value of the versed sine of angles movable between the scales of the first named member, one of said versed sine scales being a continuation of the other.

BURTON G. DWYRE.